Figure 1:
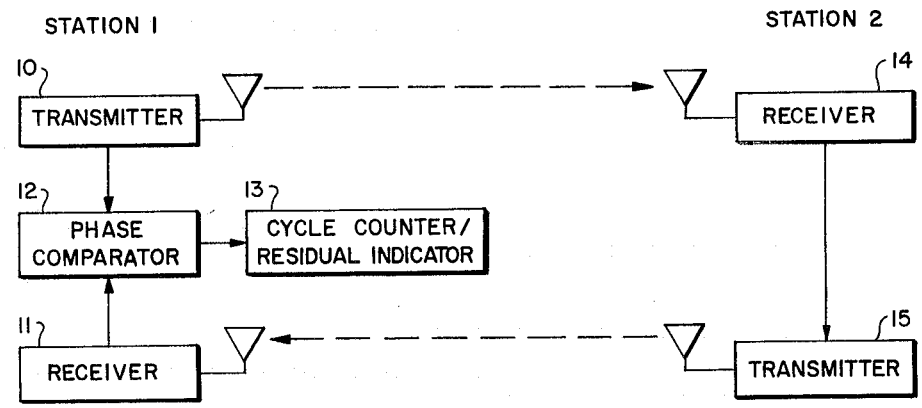

INVENTOR.
ROBERT W. WILLIAMS
BY Edward O. Ansell
ATTORNEY

United States Patent Office 3,243,812
Patented Mar. 29, 1966

3,243,812
RADIO RANGING DEVICE
Robert W. Williams, Glendale, Calif., assignor to Space-General Corporation, El Monte, Calif., a corporation of California
Filed Apr. 15, 1963, Ser. No. 273,167
7 Claims. (Cl. 343—12)

The present invention relates to a relatively simple but effective apparatus for determining the distance to an object and for determining the kinematics of that object if it is moving.

A present day technique for making range measurements is to measure the time required for a signal to go to a distant object or target and be reflected or retransmitted back to the starting point. This is commonly known as the pulser-echo technique. Another technique employed today for measuring range is to measure the phase angle between a signal reflected from a distant object and the signal then being transmitted to that object, the phase angle thusly obtained being directly proportional to the distance involved. An entirely new approach is taken by the present invention which makes it possible not only to obtain the desired information easily and with great accuracy, but also makes it possible to easily and accurately obtain such additional information as position, velocity and acceleration in the event the distant target is moving.

The essence of the present invention in providing range information is to count the number of wavelengths and fractions of a wavelength of a signal at a particular frequency between a known point or station and a point or station to which the distance or range information is desired. More particularly, in accordance with the basic concept of the invention, a signal whose frequency is varied in a prescribed manner is transmitted to the distant station, the initial frequency being sufficiently low to insure that the distance between the two stations is less than one wavelength and the final frequency being sufficiently high to achieve the desired resolution. By counting the number of zero crossings encountered between the initial and final frequencies, the number of wavelengths of separation between the stations is established. Since wavelength is equal to the velocity of light divided by frequency, the above-said number plus any residual fraction of a wavelength constitutes an accurate measure of distance. In mechanizing the invention, direct transmission and reflection may be utilized or a repeat of the transmission from the second station may be used as well. In addition, a sub-carrier modulated onto a reference carrier using either reflection or repeat transmission from the second station may also be employed advantageously.

A system following the principles of the present invention may be used for determining the distance and rate of closure between two stations, such as an earth bound tracking station and a ballistic missile, satellite, or space vehicle or, conversely, between a space vehicle and another space vehicle. Such a system may also be used to measure the distance between survey points, the length of a transmission line, and the velocity of propagation, dielectric constant or index of refraction of a medium when the distance is known. Again, it may be used at airport terminals to distinguish between relatively closely congregated planes in the air to provide them with collision-avoidance information or, on the other hand, to provide them with landing instructions. In general, the present invention could be useful wherever range or distance information or information related to or derived therefrom would be helpful.

It is, therefore, an object of the present invention to provide a simple apparatus for accurately measuring distance.

It is another object of the present invention to provide an apparatus that establishes an integral number of wavelengths between two points and then observes this number plus any residual fraction of a wavelength.

It is a further object of the present invention to provide an apparatus for obtaining the kinematics of a moving body by measuring the number of wavelengths to that body and the changes in this number.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only and is not intended as a definition of the limits of the invention.

Figure 2:
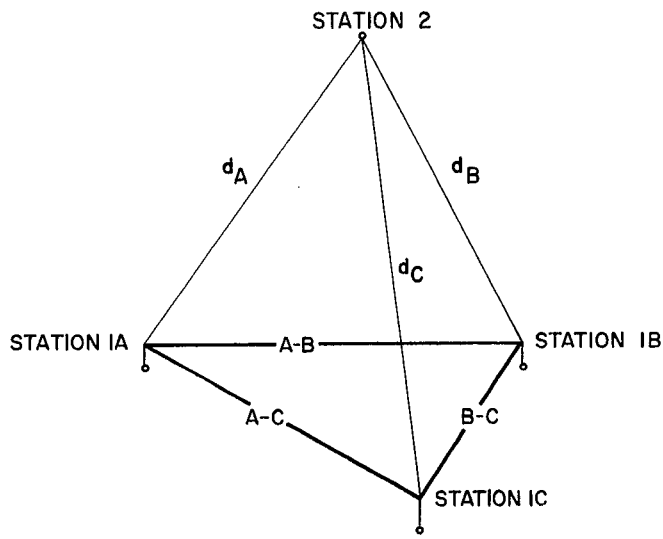

FIG. 1 is a block diagram of a radio ranging system according to the present invention; and FIG. 2 is a geometric representation of the manner in which embodiments of the present invention may be used to determine the position and kinematics of an object.

Referring now to the drawing, reference is made to FIG. 1 wherein the embodiment is shown to include a transmitter 10, a receiver 11, a phase-comparator network 12 connected between transmitter 10 and receiver 11, and a cycle counter and residual indicator mechanism 13, connected to the output end of the comparator network, all of these units being located at a first point or station. At a second point or station located some distance from the first, there is located another receiver 14 and another transmitter 15 coupled to it. The units delineated are standard pieces of equipment, including transmitter 10 which must be capable of varying the frequency of the signal transmitted by it. In this regard, the initial frequency should be low enough so as to insure that the wavelength of the signal is initially greater than twice the separation or distance between the two points or stations. The upper frequency limit of the transmitted signal should, on the other hand, be sufficiently high so that the desired resolution may be achieved, as will be more clearly understood later.

In considering the operation, it should first be mentioned that the signal transmission path length equal to twice the distance between station 1 and station 2 is measured in terms of $n\lambda + \Delta\lambda$, where $n$ is an integer equal to or greater than zero, $\Delta$ is a fraction less than 1, and $\lambda$ is the wavelength of the transmitted signal and may be converted to feet or meters by the equation previously set forth, namely, $\lambda = c/f$, $c$ representing the velocity of light and $f$ being the frequency of the transmitted signal. To determine the values of $n$ and $\Delta$, and thereby determine the signal transmission path length or twice the distance between station 1 and station 2, the wavelength of the signal to be transmitted is set to a very large value to insure that initially $n=0$. This is done by making the frequency of the signal very low. The signal at this low initial frequency is transmitted by transmitter 10 to receiver 14 at station 2, where it is received, passed to transmitter 15 and then retransmitted back to receiver 11 at station 1. At station 1, the received and transmitted signals are introduced to phase-comparator network 12 where the phases of the two signals are compared.

As may be expected, the wave will exhibit a phase shift between the station 1 transmitter and the station 2 receiver of $d/\lambda \times 2\pi$ radians, $d$ representing the distance between the two stations, and an equal additional phase shift between the station 2 transmitter and the station 1 receiver so that the phase comparator will show the transmitted and received signals at station 1 to have a total phase shift of $2d/\lambda \times 2\pi$ radians for the double length transmission path. As previously mentioned, the frequency is initially adjusted to insure that the quantity $2d/\lambda$ is less than one so that the phase shift initially is less than $2\pi$ radians or less than 360° out of the phase-comparator.

Next, the frequency of the signal transmitted by transmitter 10 is increased. As the wavelength is thusly reduced, $2d/\lambda$ is increased to a value $n+\Delta$, where $n$ is the aggregate number of $2\pi$ radians and $\Delta$ is the residual phase difference and is less than a full $2\pi$ radian shift. The quantity $n$ is measured by counting the number of $2\pi$ radians out of the phase comparator and this may be done by adapting the phase comparator network to produce a pulse each time the signals compared pass through a 360° phase difference between them. These pulses are counted by the cycle counter in mechanism 13, while the then existing fractional phase angle is indicated by the residual indicator portion of the mechanism. Thus the distance between the two stations can be represented by the equation $$d = \frac{(n+\Delta)\lambda}{2} = \frac{(n+\Delta)c}{2f_0}$$

where $f_0$ is the final value of frequency of the signal transmitted by transmitter 10. As heretofore mentioned, $f_0$ is selected to provide the degree of precision required since when $n$ is sufficiently large, the uncertainty in the determination of $\Delta$ constitutes a negligibly small error.

In using this system, the range information is presented as the integral and fractional number of wavelengths, at a specified frequency, and in the distance from station 1 to station 2 and back again to station 1, as indicated on the wavelength counter and residual indicator. When the object at station 2 moves relative to station 1, the number of wavelengths separation changes and this number plus the new residual fraction is also indicated by the counter and residual indicator mechanism 13. The velocity of this motion may be determined by the rate of change of relative phase and may be presented by observing the amount of change in phase during a selected time interval.

Not only may the distance between stations 1 and 2 be accurately obtained by means of the apparatus and technique described, but by using three reference stations at known locations as shown in FIG. 2, the unknown station position may be located in space. In addition, if the object at station 2 is in motion, the kinematics of the motion may be established by measurement of the distance from each of the three reference stations to station 2 as well as the rates of change of each of these quantities. More specifically, if the apparatus shown at station 1 in FIG. 1 is located at each of stations 1A, 1B and 1C in FIG. 2, and the distances between these stations on the surface of the earth are known very accurately, then the position of station 2 may also be determined very accurately as well as the kinematics of station 2 should it be a moving object.

One way to successfully operate the arrangement of FIG. 2 is to transmit a carrier signal from each of the three stations whose frequency is different from that of the other two carrier signals, each such carrier signal being modulated by a sub-carrier signal whose frequency varies in the manner previously described and for the reasons mentioned. It will be recognized by those skilled in the art that since three different carrier frequencies are employed, the receiver at each reference station will be tuned only to the carrier frequency transmitted by that station, thereby eliminating the confusion that would result if each receiver were to accept all three signals. Another way to eliminate this kind of interference is to transmit carriers at the same frequency from stations 1A, 1B and 1C but have each of the sub-carriers respectively varied over three different frequency ranges. Upon being returned from station 2, the three sub-carrier signals could then be separated from each other through the use of appropriate filters respectively located in the receivers 11 at stations 1A, 1B and 1C.

Finally, it should be mentioned that when practical, the transmitter and receiver at station 2 (receiver 14 and transmitter 15 in FIG. 1) may be eliminated and the signal returned to station 1 by reflection rather than by retransmission.

What is claimed is:

1. The combination comprising: first means for transmitting a wave of variable wavelength from a first station to a second station, the wavelength of said wave being decreased from an initial value that is greater than the round trip signal transmission distance between said first and second stations to a final value that is a fraction of said distance; second means at said second station for returning said wave to said first station; and third means at said first station for determining the round trip signal transmission distance between said first and second stations in terms of the final number of wavelengths plus any fraction thereof existing between said stations.

2. A combination for determining the distance between first and second stations, said apparatus comprising: means at the first station for transmitting a wave of decreasing wavelength to the second station, the initial wavelength of said wave being greater than the round trip signal transmission distance between the two stations and its final wavelength being $n$ times smaller than said separating distance, $n$ being an integer greater than one; a target at the second station for reflecting said wave to the first station; and additional means at the first station for determining the final number of wavelengths plus any fraction thereof in the round trip signal path distance between the two stations.

3. In combination, means for transmitting a wave from a first to a second station and back again; apparatus at said first station for continuously decreasing the wavelength of said wave from an initial value that is greater than the sum of the transmission and return paths between said stations to a final value that is considerably less than the sum of the length of said paths; and equipment at said first station for counting the number of zero crossings between the initial and final wavelengths, said count constituting the number of wavelengths of separation between the stations.

4. In combination, means for transmitting a wave from a first to a second station and back again, said means including apparatus for sweeping said wave through a range of frequencies such that the initial wavelength of said wave is greater than the sum of the round trip signal path length between said stations and its final wavelength considerably less than said path length; and a network arrangement for comparing the phase of the wave received from said second station with that of the wave being transmitted at said first station during said sweep, said network arrangement being adapted to indicate the total number of $2\pi$ radians phase shift plus any residual fraction thereof between said received and transmitted waves at the final sweep frequency.

5. In combination, means for transmitting a carrier signal from a first to a second station and back again, said means including apparatus for modulating said carrier signal with a sub-carrier signal whose frequency is swept through a range of frequencies between lower and upper limits such that the wavelength of the sub-carrier signal at said lower frequency limit is greater than twice the length of the paths between said stations and at said upper frequency limit is considerably less than twice said path lengths; equipment at said first station for demodulating the carrier signal after it has been returned from said second station; and circuitry for comparing the phase of the sub-carrier signal received from said second station with that of the modulating sub-carrier signal being transmitted to said second station during said sweep, said circuitry being adapted to indicate the total number of $2\pi$ radians phase shift plus any residual fraction thereof between said sub-carrier signals.

6. The combination comprising: first, second and third transmitters for transmitting first, second and third carrier signals at first, second and third frequencies, respectively, to a distant station, said first, second and third transmitters respectively being positioned at first, second and third sites on the surface of the earth, the distances between said transmitter sites being known, said first, second and third transmitters respectively being equipped to modulate said first, second and third carrier signals with a sub-carrier signal whose frequency is swept through a range of frequencies between lower and upper limits such that the wavelength of said sub-carrier signal at said lower frequency limit is greater than the round trip signal path length between said distant station and said transmitters and at said upper frequency limit is considerably less than said path lengths; means at said distant station for returning said first, second and third modulated carrier signals to said transmitters; equipment at each of said first, second and third sites for demodulating the associated carrier signal; and apparatus for comparing the phase of the sub-carrier signal returned to each site with that of the modulating sub-carrier signal during said frequency sweep, said apparatus being adapted to indicate the distances between said first, second and third transmitter sites and said distant station by counting the number of wavelengths of said sub-carrier signal at its upper frequency limit between said distant station and each of said sites.

7. The combination comprising: first, second and third transmitters for respectively transmitting to a distant station first, second and third carrier signals at the same frequency, said first, second and third transmitters respectively being positioned at first, second and third sites on the surface of the earth, the distances between said transmitter sites being known, said first, second and third transmitters including means to respectively modulate said first, second and third carrier signals with first, second and third sub-carrier signals whose frequencies are respectively swept through first, second and third ranges of frequencies, the initial wavelengths of said sub-carrier signals respectively being greater than the round trip signal path length between said distant station and said transmitters and the final wavelength of said sub-carrier signals respectively being several times less than said path lengths; apparatus at said distant station for returning said first, second and third modulated carrier signals to said transmitters, equipment at each of said first, second and third sites for demodulating said carrier signals to reproduce said returned sub-carrier signals; first, second and third filter networks respectively coupled to the demodulating equipment at said first, second and third sites and adapted to respectively pass said first, second and third returned sub-carrier signals; and circuitry for respectively comparing the phase of the sub-carrier signals passed by said filter networks with the associated modulating sub-carrier signals during said frequency sweeps, said circuitry being adapted to indicate the distances between said first, second and third transmitter sites and said distant station by respectively counting the number of wavelengths of said sub-carrier signals at their final frequencies between said distant station and said sites.

References Cited by the Examiner

UNITED STATES PATENTS

| 2,248,727 | 7/1941 | Strobel | 343—12 |
| 2,416,741 | 3/1947 | Eltgroth | 343—103 |
| 2,470,787 | 5/1949 | Nosker | 343—12 |
| 2,949,603 | 8/1960 | Logue | 343—12 |

CHESTER L. JUSTUS, *Primary Examiner.*

R. E. KLEIN, P. M. HINDERSTEIN,
*Assistant Examiners.*